United States Patent Office 3,189,568
Patented June 15, 1965

3,189,568
OIL RESISTANT OVERLAY FOR ASPHALT
William J. Sparks, Westfield, and Albert M. Gessler, Cranford, N.J., assignors to Esso Research and Engineering Company, a corporation of Delaware
No Drawing. Filed Apr. 29, 1960, Ser. No. 25,518
9 Claims. (Cl. 260—22)

This invention relates to a novel type of paving construction and methods of preparing same, and more especially it relates to providing a simple method of coating any type of highway surface, e.g. macadam, asphalt-concrete, or Portland cement concrete, with a light-colored resilient surface coating which is not only water resistant but also resistant against softening by gasoline, jet fuels and lubricating oils.

Heretofore, asphalt concrete roads have been used extensively because they provide lower cost construction, greater flexibility and less glare than concrete highways designed for similar service, and yet have far greater durability and require less maintenance than the lower cost water-bound macadam roads. However, the black surface of asphalt roads is not as satisfactory as could be desired for certain purposes. For instance, at night, particularly when wet, the driving visibility is not as good with asphalt surfaces as with other types which are not black. Published statements indicate that $715/mile/yr. more is required to light up asphalt roads than concrete. Also, asphalt surfaces are subject to an undesirable softening either under excessive heat alone, or when contacted with spillage of gasoline, jet fuels, lubricating oils and greases. Besides, upon aging, asphalt surfaces tend to slowly harden and crack due to oxidation and other weathering influences.

Even Portland cement concrete discolors badly when wet thus reducing visibility on dark, wet nights which are most critical from safety considerations. Furthermore, most Portland cement concrete road ultimately must be resurfaced with asphalt.

An object of the present invention is to overcome the disadvantages of such asphalt paving, while at the same time retaining a low-cost type of construction and also obtain a good resiliency in the paving surface, and providing resistance against softening due to heat or contact with oils.

Various types of polymers have been mixed with aggregate material in order to provide a coating which will meet the criteria set out above. For example, many thermosetting plastics have been employed as binding material for the aggregate. The resultant products, while satisfactory from the solvent resistance standpoint, suffer many disadvantages such as dark coloration and difficulty in application on the asphalt surfaces. In order to overcome the difficulties of application and the color problem, it has been desirable to utilize thermoplastics as the binder material for the aggregate. Thermoplastic binders melt and set simply by the application of heat and subsequent cooling. This greatly facilitates spreading it over the desired surface, allowing the use of conventional asphalt spreading equipment. In the case of thermosetting plastics, complex curing times must be considered as well as the mixing of the monomeric substances just prior to application. Such factors seriously complicate the procedure which must be employed by those applying the material. In employing a thermoplastic binder for these applications, it is, of course, desirable to use an inexpensive polymer having satisfactory oil-resistance, strength, and flexibility.

In employing a thermoplastic binder for coating, it is necessary that the binder be fusible, flexible, and oil insoluble. Not all thermoplastics fill these requirements. For example, the insolubility of certain hydrocarbon polymers, e.g. polyethylene, is dependent on their crystallinity. Inherent with crystallinity is extreme volume change with hardening, which makes such material difficult to apply as paving surfaces.

The most ideal type of binder for the stone and sand used for road construction is one that has flow properties in the same range as asphalt which is conventionally used. As in the case of asphalt, from 1 to 10 wt. percent of binder may be added to the stone or sand aggregate. It is most preferred, however, to add between about 5 and 10 wt. percent.

In accordance with this invention, it has been discovered that polyesters or alkyd resins can be modified to overcome their hardness and brittleness so as to be able to simulate the flow properties of asphalt without limiting their oil resistance or light coloration.

More specifically, the polyesters are modified by the addition of a reagent or reagents which react to form a pendant long chain connected to the principal polyester chain by an ester linkage. The pendant long-chain esters must have at least six carbon atoms.

The modification of the polyester may be brought about by several techniques. Preferred is the addition of a polyol, i.e. polyhydric alcohols such as glycerine, and long-chain fatty acids such as oleic acid to the comonomers which form the polyester.

Alternatively, glyceride-type compounds may be added to the comonomer and through partial transesterification the pendant long-chain ester will be formed during polymerization.

To clarify the structure of the binder of the instant invention the following formula is given. The comonomers used in this example are phthalic anhydride and ethylene glycol, oleic acid and glycerine are used as the modifiers. For simplicity, the symbol P shall be used to represent the

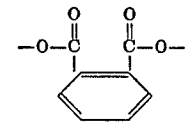

group and R shall represent the —CH$_2$CH$_2$— group:

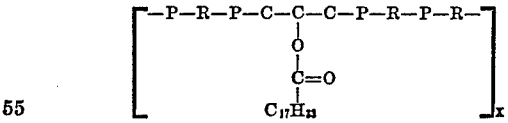

In the above formula, X has a value dependent on the molecular weight of the polymer to be formed. The desired molecular weight of the binder is discussed below. It should be noted that all three hydroxyl groups on the glycerine are esterified. Two of these groups react with the phthalic anhydride to form part of the principal or backbone chain, while the third hydroxyl group reacts with the oleic acid to form the pendant long-chain ester.

Since there must be a stoichiometric equivalence between the hydroxyl and carboxylic acid groups present, it may be desirable to alter the conventional 1:1 mole ratio between a polyol and polyacid that would be used to form the unmodified polyester. Such an adjustment of the molar quantities of the reagents is easily determined by one skilled in the art. For example, in the formation of the modified polyester shown above, the ratio of reactants may be:

| | Moles |
|---|---|
| Phthalic anhydride | 4 |
| Ethylene glycol | 3 |
| Glycerine | 1 |
| Oleic acid | 1 |

Since 4 moles of phthalic anhydride represent 8 moles of carboxyl function and one mole of oleic acid represents 1 mole of carboxyl function, the above formulation would contain 9 moles of carboxylic acid groups. This must be stoichiometrically balanced by 9 moles of hydroxyl group. The 3 moles of ethylene glycol contributes 6 moles of hydroxyl, while the 1 mole of the trihydroxyl glycerine contributes 3 moles of hydroxyl. Hence, it can readily be seen that the above four reactants are in stoichiometric balance. There are, of course, several ratios of the reactants which would give a stoichiometrically balanced system.

Formation of the modified polyester, as mentioned above, can also be formed by the addition of a glyceride to the copolymers. If the binder composition is produced through this technique, partial transesterification occurs. Any two of the glyceride links can transesterify with the carboxyl or ester function of the polyester backbone thereby introducing glycerine into this polymer. The ester linkage on the third carbon atom remains unaltered and contains the pendant long-chain ester which serves to modify the alkyd polymer. Examples of the glycerides that may be used as modifiers include tall oil and corn oil. Corn oil is composed predominantly of glycerides of oleic, linoleic acid, palmitic and stearic acids. Most important is that the glyceride have a long-chain group (at least six carbon atoms) to form the side chain in the modified polymer.

Polyesters or alkyd-type resins are the polymerization product of dicarboxylic acids or anhydrides and dihydroxyl organic compounds. The dicarboxylic acids or anhydrides used as a comonomer in the instant invention should contain from 2 to 14 carbon atoms per molecule, preferably from 4 to 12. Examples of such acids or anhydrides are phthalic, sebacic, and isophthalic. Dihydroxyl organic compounds are preferably glycols containing from 2 to 6 carbon atoms per molecule such as, for example, ethylene glycol. In addition, polyhydroxyl organic compounds such as pentaerythritol and glycerine may be employed.

In forming the polyester binder, any of the well known polymerization processes may be used. For example, the materials may be reacted by mixing them together and heating them to about 300° F. for 1 hour and then increasing the temperature to 450° F. The reaction is completed after 2 hours at the latter temperature. The resultant polyester should have a molecular weight of from 1500 to 5000, preferably at least 2000. While a catalyst is not necessary, various catalysts may be used to accelerate the reaction. Examples include lead oxide, metallic tin and sodium alcoholates.

The amount of modifier added to the comonomers prior to polymerization is dependent on the flexibility and flow properties desired, i.e. a binder having characteristics closely analogous to asphalt. In the composition of the instant invention, it is desirable to form a binder with a penetration at 77° F. from about 12 to 112, preferably from 25 to 75, as determined by ASTM Test D5-52. Such binders, when about 5 to 10% is mixed with aggregate, form paving compositions having a Marshall stability ratio (Marshall stability at 70°/Marshall stability at 140°) of no more than 10:1, preferably 5:1. In addition, the Marshall flow at room temperature will be greater than 8%, preferably 10 to 20%.

The following table gives physical properties of various binders prepared in accordance with the instant invention.

*Table I*

| Composition, grams | Penetration at 77° F. | Softening point °F. | Furol viscosity 275° F. |
|---|---|---|---|
| Phthalic anhydride, 1,500 Ethylene glycol, 500 Glycerol, 200 Oleic acid, 300 | 12 | 130 | 278 |
| Phthalic anhydride, 1,500 Ethylene glycol, 500 Glycerol, 184 Oleic acid, 550 | 25 | 127 | 264 |
| Phthalic anhydride, 1,480 Ethylene glycol, 434 Glycerol, 286 Oleic acid, 846 | 202 | 98 | 83 |
| 50%-50% of two previous binders | 55 | 117 | 160 |

The amount of modifier to be added to the polyester to achieve these properties is dependent on the particular modifier employed, the particular polyester system and the aggregate added. For example, if phthalic anhydride and ethylene glycol are used to form a polyester, and glycerine and oleic acid are used as a modifier, it is desirable to add from 10 to 40 wt. percent of oleic acid based on the polyester to produce the desired composition. A corresponding amount of glycerine would replace ethylene glycol in accordance with the required stoichiometry as discussed above.

Strength and stability of paving constructions made according to the present invention are determined by the Marshall stability test on small cylindrical samples of the thermoplastic polymer-bonded aggregate. The Marshall stability test is described in a pamphlet "The Marshall Method for the Design and Control of Bituminous Paving Mixtures," published by the Marshall Consulting and Testing Laboratory, 1127 Fairmont Avenue, Jackson 3, Mississippi. The test is made by preheating the sand or other aggregate to be used and also preheating the thermoplastic polymer to be used (in place of asphalt), mixing the two materials in the desired proportion, and while still hot, tamping this mixture into a cylindrical mold which is about 3" high and 4" in diameter. When cooled to the test temperature, the cylinder of polymer-bonded sand is removed from the mold and subjected to a load applied diametrically about the circumference, at a constant rate of 2" per minute, until failure or until maximum stress has been reached. The amount of deformation (in $\frac{1}{100}$ of an inch) at the time of failure or maximum load, is called the Marshall flow. The Marshall stability is expressed in lbs., and may be made at various temperatures, for example, at 70 and 140° F.

In paving constructions, it is highly desirable that a pavement have a certain amount of flexibility as is the case with asphalt paving and with the polymer-bonded aggregate compositions used in the present invention, but it is also highly desirable that a pavement which has sufficient stability when hot (as in the sunshine at noon in summer) should not become too brittle during the cold weather of winter. Vice versa, it is desirable that a pavement which has good toughness characteristics when cold should not become excessively soft when hot. One method of ascertaining a merit rating of a pavement over the temperature range from cold to hot, is to determine the cold/hot Marshall stability ratio (e.g. 70° F./140° F.). For asphalt paving compositions, this stability ratio is in the vicinity of 15, one test showing 16.3 in the case of an asphalt having an 85 to 100 penetration at 77° F. On the other hand, the polymer-bonded aggregate compositions used according to the present invention generally have a corresponding cold/hot Marshall stability ratio (70° F./140° F.) of below 8 and often as excellent as 4 to 5. Thus, the compositions used in the present invention can be designed for the desired strength and stability at the intermediate or average temperature, and then will be found to develop very little in brittleness at lower temperatures, but likewise will exhibit very little in softness at higher temperatures.

Many modifications of the instant invention are possible without departing from its scope. For example, it is desirable to add from about 2 to 8 wt. percent, preferably 3 to 4 wt. percent, based on weight of aggregate, of Portland cement to the final mix. Without the addition of Portland cement, the final coating cannot withstand the action of water.

Since it is desirable to make the coating inexpensive, it is often desirable to dilute the binder with a less expensive material, such as asphalt. Various types of asphalt may be used without seriously affecting the properties of the coating produced, but light coloration is not retained. The specific amount of asphalt to be added depends on the desired properties of the finished coating. In most instances, it is desirable to employ from 5 to 50 wt. percent, preferably from 20 to 40 wt. percent of asphalt (based on the total weight of asphalt and modified polyester) as an extender.

The aggregates to be used according to the invention may be numerous conventional types or certain specially adapted types, as will be discussed further herebelow. For thin paving surface layers, e.g. about 1/16" to 1/2" or so, a fine aggregate should be used, such as a sand having a grading of about 1/4" down to 200 mesh, or a finer sand ranging from 8 mesh to 200 mesh may be used; or even finer fractions may be used, such as 20 mesh to 200 mesh; and with any of these, some dust-type fillers may be used, such as ground limestone, pulverized sand, silicas, clays, etc. On the other hand, for coarser layers, e.g. from 1/2" to 5 or 6" in thickness, or for layers of similar thickness to be used as cushion layers to be coated with finer surface coating, large crushed aggregates may be used, such as crushed stone, gravel and air-cooled slag may be used having either a mixed grading of 1/2" to 3", or 1/4" to 2" or 1/2" to 1", etc. alternatively, if a fairly thick layer, e.g. 2 to 6" or so is to be used without any finer surface coating, the aggregate used may be a material of both coarse and fine aggregate and may include a dust filler, such as a mixture of 100 parts by wt. of coarse stone, 80 parts by wt. of sand, and 4 to 5 parts by wt. of powdered limestone. The above aggregates may be graded either for density and lowest voids, or for a controlled desired amount of voids.

If desired, the fine fillers to be used, e.g. crushed silica, clays, ground limestone, or even carbon black, etc. may be subjected to severe attrition, e.g. by ball-milling with steel balls, or roll-milling through tight set steel rolls, or stamping or any other severe attrition, prior to mixing with the polymer to be coated. It has been found that such severe attrition activates the surface of the filler particles at the places where the particles have been broken or otherwise attrited, and thereby provides a tighter bond when the polymer is subsequently coated thereon.

Various methods may be used in carrying out the present invention, depending upon various factors such as the particular type of polymer composition used, the type of aggregates used and according to the type of mixing equipment available. One technique, referred to as hot plastic mixing is to heat a polymer composition having a softening point within the range of about 120 to 212° F. and a melt viscosity (cps.) of about 100 to 30,000 at mixing temperatures of 200 to 500° F., until it has softened to a hot fluid consistency, and then mix the aggregate into it, preferably gradually, until the final composition has about 90 to 99% by wt. of aggregate and about 1 to 10, preferably about 2 to 8% by wt. of polymer. The preferred procedure here is to heat the aggregate, sand, a sand and stone, to 300 to 500° F., and then to add the polymer binder, either as a flaked or pelleted solid at R.T. or in melted form at some temperature close to that of the aggregate. This is the method used in the Pug Mill for mixing asphalt, the asphalt being added at about 300° F. to aggregate at 300 to 350° F.

The paving construction may be of numerous different types, but generally should comprise a base course of crushed stone, gravel or slag or of granulated slag or cinders, etc. as a foundation layer on the road subgrade, although it is possible, if desired, to apply the polymer-bonded aggregate surface coating directly on the highway soil or subgrade. Preferably the paving construction comprises an intermediate layer such as a water-bound macadam or asphalt macadam (e.g. made by penetrating liquid asphalt down into a crushed coarse aggregate layer), or an asphalt concrete made by compacting into place a premixed hot mixture of coarse aggregate and asphalt or other bituminous binder, or a Portland cement concrete layer.

Various other specific paving modifications may be used. For instance, a polymer-coated fine sand or ground limestone may be emulsified with water and emulsifying agent, and then either applied by penetration down through a layer of coarse aggregate already in place in the roadway, or premixed with the coarse aggregate and then placed in the roadway and then rolled.

Reinforcing, e.g., steel wire mesh, may be used, if desired, to strengthen relatively thick layers of polymer-bonded aggregate made according to the present invention.

The paving surface compositions of this invention are also particularly adapted for repairing or patching holes or pock-marked surfaces of concrete highways or irregularities in the surfaces of any types of highways. They may be used for making a top coating over old asphalt road surfaces, or brick paving or concrete roads, especially those having bumps or irregularities in the surfaces.

An additional novel method of carrying out the present invention is to first prepare a polymer-bonded fine aggregate, e.g., crushed sand or ground limestone, etc., of the desired composition, then sheet the resulting composition by calendering it into thin films or sheets having a thickness of about 1/32" to 1/4" either in narrow strip form, e.g., for use as guide lines, or any types of highways or wide strips, e.g., 5 to 10 ft. or more in width, which can then be unrolled from a truck and laid directly on the highway surface and subsequently bonded into place by rolling with a heavy roller, with or without the application of heat before a during the rolling.

Either for such particular application in the form of a self-supporting sheet or film, or for application in any other manner, various colored pigments may be used, such as white titanium dioxide or blue, red, yellow, etc. pigments or dyes or even carbon black in case it is desired to be a dark color while still retaining the oil-resistance properties of the polymer.

Oxidation inhibitors and stabilizers against deterioration due to ultraviolet light may be added to the polymer compositions for use in this invention if desired. Suitable materials include alkylated phenols and bisphenols and thiophenols, amino phenols, aromatic amines and diamines, substituted aliphatic-aromatic amides, imines, etc., zinc and tellurium dithiocarbamates, sulfur, and other materials which are well known in the rubber and plastics industry.

A further modification of the invention is to press the polymer-bonded aggregate into large preformed slabs, e.g., about 4 ft. by 6 ft. to 10 ft. in size with a thickness of about 1 to 4" or so, or into bricks or blocks, patio blocks, flagstone-like slabs for walks, sidewalk pavements, cinder blocks, etc., or the polymer-bonded aggregate may be applied as a surface layer or coating on preformed slabs or bricks, etc., made of other materials such as asphalt, concrete, Portland cement concrete, clay bricks or even wooden blocks. In any case, these preformed articles are then positioned on the surface to be paved, preferably over a suitable foundation or base course of crushed stone, macadam, or concrete, and the spaces between them filled with a suitable grouting of hot thermoplastic sealant of polymer-bonded fine sand or ground limestone, and the entire road surface compacted by heavy rolling.

The various uses of the present invention include the paving of roads, streets and highways of all types, driveways leading in from roads to buildings or private homes, etc., or surface areas around stores, factories, gasoline filling stations, bus terminals, garages, airports, airport runways, decks of airplane carriers, etc. The invention is particularly useful for such purposes where it is desired to have a paving surface which is resistant to spillage of gasoline, jet fuels, or lubricating oils.

In order to illustrate the advantages of the instant invention, the following examples are given:

EXAMPLE 1

In this example, Marshall stability tests were made using different binders. To form the binder, 1500 grams of phthalic anhydride and 500 grams of ethylene glycol were polymerized without a modifier and with various modifiers of the invention. Polymerization was carried out by heating the mixture on a hot plate for 1 hour at 300° F. and then completing the reaction by heating at 450° F. for an additional 2 hours. All the samples below contained about 3% of Portland cement. The aggregate used in making up the samples was in all cases 630 grams of white stone and 492 grams of white sand. 80 grams of polyester binder were employed for this quantity of aggregate. The results obtained are shown in Table II.

Table III. The modified polyester employed corresponds to sample 3 shown in Table II in Example 1.

*Table III*

| Marshall stability | | Marshall stability, ratio 70° F./140° F. | Marshall flow 0.1", 70° F. |
|---|---|---|---|
| 70° F. | 140° F. | | |
| 25,500 | 2,650 | 9.6 | 12.0 |

The above table shows that the properties of the binder are still within the range desirable for a high quality composition.

EXAMPLE 4

To show the improved oil resistance of the binder composition of this invention, the solubility of a polyethylene composition used as a binder was compared to the modified polyester binder. The polyethylene binder contains 50% Piccopale 70, a petroleum resin added to polyethylene in order to achieve the requisite flexibility. Polyethylene alone, because of its crystallinity, is too brittle for binder applications. The insolubility in 86° naphtha of the two binders is shown below.

*Table IV*

Binder:                  Insolubility in 86° naphtha, percent
Polyethylene and Piccopale ------------------ 46.0
Polyester modified with corn oil ------------ 96.8

*Table II*

| No. | Modifier | Grams | Marshall stability | | Marshall stability, ratio 70°/140° | Marshall flow 0.1" 70° F. |
|---|---|---|---|---|---|---|
| | | | 70° F. | 140° F. | | |
| 1 | | | 35,000 | 1,950 | 18.0 | 3.0 |
| 2 | | | 30,000 | 1,950 | 15.4 | 3.0 |
| 3 | Glycerol / Oleic acid | 200 / 300 | 21,750 | 2,300 | 9.6 | 17.0 |
| 4 | Glycerol / Corn oil | 134 / 666 | 6,550 | 1,750 | 3.7 | 15.0 |

The above data clearly show the advantages of the instant invention. The coatings containing unmodified polyester shown in samples 1 and 2 have an extremely high Marshall stability ratio and low Marshall flow at room temperature. This indicates a very hard, brittle coating having low flexibility characteristics.

On the other hand, the coatings containing the modified polyester binder of this invention exhibit Marshall stability ratios less than 10 and in one case less than 5—see specifically sample number 4. Where the modified oil was used, it should be noted that Marshall flow was in excess of 9. These two properties indicate that a valuable road-surfacing composition has been produced.

EXAMPLE 2

Sample 3 shown in Table I in Example 1 was prepared without the addition of Portland cement. The material fell apart when placed in a water bath at 140° F. This shows the desirability of the addition of Portland cement in the coatings of the invention.

EXAMPLE 3

To show that an excellent binder may be obtained even after the addition of asphalt to the binders of this invention, 30 parts of asphalt were mixed with 50 parts of a modified polyester. 80 parts of this mixture were blended with 630 parts of white stone, 492 grams of white sand and 34 parts of Portland cement. Marshall stability and flow tests were performed and the results shown in These data clearly show the improved solubility characteristics of a modified polyester as compared with a conventionally prepared polyethylene binder.

The examples given above are only illustrative of the instant invention and are not meant to determine its scope.

What is claimed is:

1. A light colored, oil resistant paving composition which comprises a mineral aggregate and from 1 to 10 weight percent of a flexible, oil insoluble polyester resinous binder prepared by the reaction of stoichiometrically balanced quantities of a dicarboxylic acid containing from about 4 to 12 carbon atoms per molecule and a glycol containing from 2 to 6 carbon atoms per molecule, said resin modified to have pendant long chain ester groups containing at least 6 carbon atoms and to have an ASTM penetration at 77° F. of from about 12 to 112, by the addition of a reactant selected from the class consisting of (a) a long chain fatty acid and glycerol, and (b) a glyceride, said resinous reactants being in stoichiometric balance and said resultant paving composition having a Marshall stability ratio measured at 70° F./140° F. of less than 10:1 and a Marshall flow at 70° F. greater than 8.

2. The composition of claim 1 wherein the dicarboxylic acid is phthalic anhydride, the glycol is ethylene glycol, and the fatty acid is oleic acid.

3. The composition of claim 1 wherein the dicarboxylic acid is phthalic anhydride, the dihydroxyl alcohol is ethylene glycol, and the glyceride is corn oil.

4. The composition of claim 1 wherein said binder contains from 5 to 50 wt. percent of asphalt.

5. The composition of claim 1 wherein said composition contains from 2 to 8% of Portland cement.

6. The composition of claim 1 wherein said paving composition has a Marshall stability ratio measured at 70° F./140° F. of less than 5:1 and a Marshall flow from 10 to 20.

7. A light colored, oil resistant, water resistant paving composition which comprises a fine sand aggregate, from 2 to 5 weight percent of Portland cement and from 1 to 10 weight percent of a flexible, oil insoluble, resinous binder prepared by the reaction of 4 moles of phthalic anhydride with 3 moles of ethylene glycol, said resin modified to have pendant long chain ester groups containing at least 6 carbon atoms and to have an ASTM penetration at 77° F. of from about 12 to 112 by the addition of 1 mole of glycerol and 1 mole of oleic acid, said paving composition having a Marshall stability ratio measured at 70° F./140° F. of less than 10:1 and a Marshall flow at 70° F. greater than 8.

8. A process of preparing light colored, oil resistant paving composition, which process comprises preparing a polymer bonded fine aggregate composition by heat mixing sand and from 1 to 10 weight percent of a flexible, oil insoluble polyester resinous binder prepared by the reaction of stoichiometrically balanced quantities of a dicarboxylic acid containing from about 4 to 12 carbon atoms, per molecule and a glycol containing from 2 to 6 carbon atoms per molecule, said resin modified to have pendant long chain ester groups containing at least 6 carbon atoms and to have an ASTM penetration at 77° F. of from about 12 to 112, by the addition of a reactant selected from the class consisting of (a) a long chain fatty acid and glycerol, and (b) a glyceride, said resinous reactants being in stoichiometric balance and said resultant paving composition having a Marshall stability ratio measured at 70° F./140° F. of less than 10/1 and a Marshall flow at 70° F. greater than 8.

9. A process as described in claim 8 wherein water resistance is imparted to the paving composition by the incorporation of from 2 to 8 weight percent of Portland cement in the said composition.

References Cited by the Examiner

UNITED STATES PATENTS

| | | | |
|---|---|---|---|
| 1,098,728 | 6/14 | Howell | 260—22 |
| 2,197,855 | 4/40 | Ellis | 260—22 |
| 2,481,322 | 9/49 | McCoy | 260—28 |
| 2,769,790 | 11/56 | Edson et al. | 260—28.5 |
| 2,944,991 | 7/60 | Hart | 260—22 |
| 2,954,354 | 9/60 | Young | 260—22 |

OTHER REFERENCES

Singer: Fundamentals of Paint, Varnish and Lacquer Technology, American Paint Journal Company, St. Louis, Mo., 330 pages, 1959 (page 9 of interest).

LEON J. BERCOVITZ, *Primary Examiner.*

A. M. BOETTCHER, A. D. SULLIVAN, *Examiners.*